United States Patent [19]  [11]  4,117,106
Bendig et al.  [45]  Sep. 26, 1978

[54] METHOD FOR PRODUCING BAYERITE

[75] Inventors: Larry L. Bendig; John F. Scamehorn, both of Ponca City, Okla.

[73] Assignee: Continental Oil Company, Ponca City, Okla.

[21] Appl. No.: 820,527

[22] Filed: Aug. 1, 1977

[51] Int. Cl.$^2$ ................................................. C01F 7/02
[52] U.S. Cl. ...................................... 423/630; 423/628
[58] Field of Search ................................ 423/628, 630

[56] References Cited

U.S. PATENT DOCUMENTS

| | | | |
|---|---|---|---|
| 2,917,365 | 12/1959 | Gilbert | 423/628 |
| 3,264,063 | 8/1966 | Carter | 423/630 |
| 3,419,352 | 12/1968 | Acciarri | 423/630 |

Primary Examiner—Herbert T. Carter
Attorney, Agent, or Firm—Cortlan R. Schupbach, Jr.

[57] ABSTRACT

Aluminum alkoxides are hydrolyzed at low temperatures using high injection velocities and are then vacuum stripped at or below 80° C to produce β-alumina trihydrates in large proportion. The β-alumina trihydrate can then be converted to eta alumina.

3 Claims, No Drawings

METHOD FOR PRODUCING BAYERITE

This invention relates to an improved method for bayerite production. More specifically this invention deals with a method of enhancing bayerite production using the low temperature hydrolysis of aluminum alkoxides.

It is well-known in the art to prepare various types of alumina such as eta, gamma, etc. by the hydrolysis of aluminum alcoholates in either acidic or basic mediums drying and calcining to obtain the form desired. Specifically in the production of eta alumina, it is necessary to have bayerite (alumina trihydrate form) before calcining to produce the eta alumina. Technical Paper #10 entitled "Alumina Properties" by Newsome et al, published by the Aluminum Company of America 1960, page 46, shows that eta alumina can only be obtained by heating beta trihydrate. Other forms of alumina immediately after hydrolysis such as alpha aluminum trihydrate, alpha aluminum monohydrate, and beta aluminum monohydrate will not produce the eta form. Eta alumina is useful in catalysts refractories, and other well-known applications.

It is therefore of great importance when eta alumina is desired to increase the yield of beta trihydrate (bayerite) in order that higher yields of eta alumina can be obtained.

Bayerite and eta alumina is well-known in the art. For example in U.S. Pat. No. 3,264,063 in Example 5, it is stated that eta alumina was obtained. However, the Example also indicates that the hydrated form prior to calcination was alpha aluminum monohydrate. This would appear to be an error in the teachings of the patent since it is well-known that eta alumina cannot be obtained from alpha alumina monohydrate. U.S. Pat. No. 2,970,891 teaches that hydrolysis of aluminum alcoholate at temperatures below about 40° F in the presence of carbon dioxides supplied as dry ice, followed by aging, steam stripping, and then heating allows the eta alumina to be obtained. U.S. Pat. No. 2,970,892 teaches that an alumina formed at 150° F needs three hours aging as against 1 hour aging for alumina formed at 80° F for conversion to beta aluminum trihydrate (bayerite). In addition, an article by Yoldas (Journal of Applied Chemical Biotechnology (1973) Volume 23, pages 803-809) shows that bayerite can be made by the low temperature hydrolysis of aluminum alkoxides followed by a period of aging. A mechanism is explained as follows:

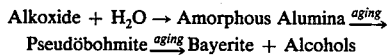

The bayerite is thus formed by the dissolution of the pseudöbohmite and recrystallization of the bayerite in the presence of a large molar excess of water. However all of these patents and papers indicate that an aging period is necessary in order to obtain bayerite. It would be of great benefit to increase bayerite yield by eliminating the necessity for an aging period and allowing immediate production of bayerite which can then be converted to the eta form as desired.

It is therefore an object of the instant invention to provide an improved method for the production of bayerite using the hydrolysis of aluminum alkoxides. Other objects will become apparent to those skilled in this art as the description proceeds.

It has now been surprisingly discovered that by combining low temperature hydrolysis and high alkoxide injection velocity that a great deal more bayerite can be formed than by using either method alone. Apparently the high alkoxide injection velocity helps to form more of the pseudobohmite phase which forms bayerite than does normal injection velocity. Temperature is apparently critical during the process of the instant invention and must be maintained in the range of 100° F to about 160° F. By-products and absorbed alcohols are removed usually by steam-stripping under a vacuum at temperatures of from 100° F to about 160° F, followed by spray drying. Bayerite is then recovered directly without an aging period.

Usually the hydrolysis product is extracted to remove alcohols which contain 6 or more carbon atoms and the extraction is carried out at a temperature of about 100° F to about 160° F. The extractant hydrolysis product is then vacuum stripped to remove the extraction agent, the vacuum stripping itself taking place at temperatures of from about 100° F to about 160° F.

Throughout this specification and claims the term "low temperature" will indicate temperatures of between about 100° F and about 160° F. The term "high velocity" means velocities equal to or greater than 100 feet per second as determined using the following formula:

$$V = \frac{F}{\rho A}$$

wherein V = velocity, F = flow of rate in pounds per second, $\rho$ = density in pounds per cubic foot, and A = orifice area in square feet.

When the hydrolysis of aluminum alkoxides is carried out according to the process of the instant invention, bayerite is obtained in greatly improved yield and without the necessity of an aging period as described in the prior art. Thus a great improvement over the prior art is obtained in that production of bayerite and subsequent eta alumina can be vastly increased.

The invention is more concretely described with reference to the examples below wherein all parts and percentages are by weight unless otherwise specified. The examples are intended to illustrate the instant invention and should not be construed to limit it.

In all examples set forth in Tables 1 and 2 below, the aluminum alkoxide used was obtained from a plant stream engaged in the production of alcohols using the Ziegler process. The alkoxide was injected into water at varying injection velocities and at varying temperatures. An analysis of the phase compositions was made using thermal gravimetric analysis and is described in Table 1.

Column 3 of Table 1 was produced using large excesses of water, thus producing the high level of Bayerite. However, such production also required an aging time of several hours. In addition, bayerite obtained from the Bayer process also contains large amounts of inorganic ions, leading to impure bayerite not suitable for many uses, acting as a catalyst poison in some processes.

TABLE 1

| Run No. | Alumina Phase Composition | | |
|---|---|---|---|
| | 1 | 2 | 3 |
| Purpose | Low Temp. High Inj. Vel | Low Temp. Normal Inj. Vel | Low Temp. Glassware (Low Inj. |

TABLE 1-continued

| | Alumina Phase Composition | | |
|---|---|---|---|
| Run No. | 1 | 2 | 3 |
| Injection Velocity ft/sec | 119 | 7.5 | — (Vel) |
| H₂O/Alkoxide (wt. ratio) | 1.1 | 1.1 | 5.0 |
| Phase Composition: | | | |
| % Free Water | 3.3 | 4.6 | 1.5 |
| % Bohmite | 5.5 | 0 | 4.8 |
| % Pseudobohmite | 8.5 | 57.9 | 13.0 |
| % Bayerite | 81.1 | 36.2 | 80.0 |
| % Other | 1.58 | 1.20 | 0.62 |

Table II illustrates the effect of various process variables upon the production of bayerite. In the columns of Table II, columns A and B are standard runs, B using mixer/settlers and A using an extraction column. Columns C, D and E show increased Bayerite production using high injection velocities calculated as explained above. Column E had the highest injection velocity, while C and D show different spray drier conditions. Column F shows the results of high injection velocity, low temperature extraction and hydrolysis and high temperature steam stripping. Columns G and H show low temperature hydrolysis, extraction and steam stripping at low (or normal) injection velocities; H also was aged for 20 hours prior to drying. Columns I and J show the effects of high injection velocity, low temperature extraction and hydrolysis and low temperature steam stripping; J also was aged for 20 hours prior to drying.

TABLE II

| | PROCESS VARIABLE COMPARISON | | | | | | | | | |
|---|---|---|---|---|---|---|---|---|---|---|
| Independent Process Variables | A | B | C | D | E | F | G | H | I | J |
| Hydrolysis | | | | | | | | | | |
| Injection Nozzle Diameter (inches) | 0.158 | 0.158 | 0.031 | 0.031 | 0.025 | 0.025 | 0.1 | 0.1 | 0.025 | 0.025 |
| Reactor Temperature (° F) | 201 | 198 | 205 | 205 | 201 | 144 | 142 | 142 | 141 | 141 |
| Alkoxide Temperature (° F) | 181 | 182 | 184 | 184 | 181 | 134 | 125 | 125 | 130 | 130 |
| Water Temperature (° F) | 189 | 190 | 178 | 178 | 186 | 104 | 112 | 112 | 98 | 98 |
| Recycle Butanol Temperature (° F) | 166 | 167 | 122 | 122 | — | 115 | 112 | 112 | 115 | 115 |
| Water pH | 12 | 12 | 12 | 12 | 12 | 12 | 12 | 12 | 12 | 12 |
| Alkoxide Flow Rate (Lb/Hr) | 182 | 174 | 180 | 180 | 200 | 82 | 83 | 83 | 83 | 83 |
| Water Flow Rate (Lb/Hr) | 200 | 193 | 195 | 195 | 189 | 76 | 107 | 107 | 107 | 107 |
| Alkoxide Injection Velocity (Ft/Sec) (Estimated) | 6.9 | 6.6 | 178 | 178 | 304 | 121 | 7.7 | 7.7 | 122 | 122 |
| Extraction | | | | | | | | | | |
| Extractor Temperature (° F) | 171 | — | 184 | 184 | — | 142 | 130 | 130 | 130 | 130 |
| Butanol Temperature (° F) | 190 | 181 | 193 | 193 | — | 118 | 122 | 122 | 108 | 108 |
| Extraction System (column/mixer-settler) | Column | Mixer Settler | Column | Column | Mixer Settler | Column | Column | Column | Column | Column |
| Stripping | | | | | | | | | | |
| Slurry Feed Temperature ° F | 182 | 162 | — | — | 174 | 142 | 137 | 137 | 133 | 133 |
| Stripping Pressure (PSIA) | 14.2 | 14.2 | 14.2 | 14.2 | 14.2 | 14.2 | 5 | 5 | 5 | 5 |
| Spray Drying | | | | | | | | | | |
| Ageing Time Since Stripping (Hr) | — | — | — | — | — | 2 | 2 | 20 | 2 | 20 |
| Outlet Temperature (° F) | 302 | 299 | 221 | 297 | 275 | 284 | 284 | 301 | 287 | 307 |
| Slurry Flow Rate (Lb/Hr) | 36.0 | 32.0 | 59.5 | 40.3 | 40.5 | 36.0 | 34.0 | — | 33.3 | — |
| Run Time (Hr) | — | 3 | 2 | 3 | 6 | 1 | 2 | 2.5 | 2 | 1 |
| Preheat (Yes/No) | — | No | No | No | No | No | No | No | No | No |
| Product Power Properties | | | | | | | | | | |
| Surface Area (M²/GM) | 288 | 348 | 312 | 279 | 348 | 346 | 374 | 346 | 341 | 402 |
| Loose Bulk Density (Lb/Ft³) | 44.7 | 40.6 | 28.4 | 27.9 | 25.1 | 36.6 | 44.9 | 53.1 | 34.7 | 31.1 |
| Carbon Content (W/O) | 0.26 | 1.38 | 0.31 | 0.33 | 1.91 | 3.06 | 1.0 | 1.0 | — | 1.23 |
| Al₂O₃ Content (W/O) | 72.4 | 73.6 | 71.2 | 74.9 | 74.4 | 66.6 | 65.1 | 66.5 | 64.8 | 65.9 |
| Acid Dispersibility (W/O) | 83.2 | 70.3 | 67.1 | 55.2 | 44.0 | 57.8 | 11.6 | 18.6 | 24.3 | 18.6 |
| Crystallite Size (A) | | | | | | | | | | |
| 020 Plane | 31 | 30 | 32 | 37 | 40 | 31 | 27 | 27 | 34 | 32 |
| 021 Plane | 44 | 43 | 39 | 51 | 51 | 41 | 41 | 41 | 48 | 51 |
| Particle Size Distribution (W/O) | | | | | | | | | | |
| 149 Micron | 1.1 | 2.6 | 1.7 | 1.6 | 1.1 | 2.1 | 1.9 | 0.6 | 1.5 | 1.7 |
| 149, 105 Micron | 1.8 | 3.3 | 2.3 | 2.1 | 2.9 | 1.9 | 1.3 | 0.9 | 2.0 | 2.4 |
| 105, 74 Micron | 3.3 | 5.3 | 4.2 | 3.9 | 1.5 | 2.3 | 2.4 | 1.5 | 2.9 | 3.6 |
| 74, 44 Micron | 14.0 | 17.4 | 9.3 | 5.8 | 4.5 | 4.7 | 18.9 | 7.9 | 7.2 | 3.9 |
| 44, 20 Micron | 56.3 | 41.0 | 33.8 | 36.7 | 69.5 | 52.6 | 63.6 | 35.3 | 39.0 | 27.1 |
| 20 Micron | 23.5 | 30.4 | 48.7 | 49.9 | 20.5 | 36.4 | 11.9 | 53.8 | 46.5 | 61.3 |
| Pore Volume Distribution (CC/GM) | | | | | | | | | | |
| 0– 50 A | 0.15 | 0.22 | 0.14 | 0.07 | 0.12 | 0.17 | 0.17 | 0.20 | 0.07 | 0.02 |
| 0– 100 A | 0.43 | 0.37 | 0.43 | 0.47 | 0.37 | 0.43 | 0.81 | 0.23 | 0.14 | 0.09 |
| 0– 250 A | 0.45 | 0.38 | 0.48 | 0.55 | 0.46 | 0.45 | 0.22 | 0.24 | 0.15 | 0.11 |
| 0–500 A | 0.46 | 0.40 | 0.52 | 0.60 | 0.51 | 0.50 | 0.23 | 0.25 | 0.16 | 0.13 |
| 0– 100 A | 0.47 | 0.40 | 0.55 | 0.63 | 0.57 | 0.52 | 0.24 | 0.26 | 0.18 | 0.16 |
| 0–10000 A | 0.50 | 0.46 | 0.76 | 0.88 | 0.96 | 0.62 | 0.32 | 0.31 | 0.39 | 0.41 |
| Composition of Product (W/O) | | | | | | | | | | |
| Free Water | 11.5 | 8.8 | 9.7 | 6.3 | 4.6 | 6.3 | 4.9 | 6.4 | 3.3 | 2.4 |
| Boehmite | 31.0 | 10.5 | 19.0 | 21.4 | 16.2 | 0 | 0 | 0 | 13.4 | 3.0 |
| Pseudoboehmite | 57.2 | 79.3 | 68.6 | 69.6 | 74.6 | 64.3 | 48.6 | 60.7 | 0.6 | 13.6 |
| Trihydrate | 0 | 0 | 2.3 | 2.3 | 2.3 | 24.6 | 45.1 | 31.7 | 81.1 | 79.6 |
| Other Losses | 0.35 | 1.5 | 0.36 | 0.40 | 2.3 | 4.8 | 1.4 | 1.2 | 1.6 | 1.4 |

It can be seen from a comparison of the composition of products that bayerite reaches its peak production in columns I and J, and that columns G and H have vastly improved production over the prior art process conditions.

It is therefore apparent that the instant invention provides a vastly improved process for the preparation of eta alumina whereby bayerite can be obtained without an aging period thus allowing increased production.

While certain embodiments and details have been shown for the purpose of illustrating this invention, it will be apparent to those skilled in this art that various changes and modifications may be made herein without departing from the spirit or the scope of the invention.

We claim:

1. A method for enhancing bayerite production during the low temperature hydrolysis of aluminum alkoxides comprising injecting aluminum alkoxides into water or an aqueous solution at a temperature of from about 100° F to about 160° F wherein said injection is carried out at an injection velocity equal to or greater than 100 feet per second as determined using the formula $V=F/\rho A$ wherein A is orifice area in square feet, $\rho$ is density in pounds per cubic foot, and F is flow rate in pounds per second, by-products and adsorbed alcohols are removed, and bayerite is recovered without an ageing period.

2. A method as described in claim 1 wherein the hydrolysis product is extracted to remove alcohols having 6 or more carbon atoms, said extraction carried out at a temperature of from about 100° F to about 160° F.

3. A method as described in claim 2 wherein the extracted hydrolysis product is vacuum stripped to remove the extraction agent, said vacuum stripping taking place at a temperature from about 100° F to about 160° F.

* * * * *